United States Patent
Takuwa et al.

(10) Patent No.: US 6,463,229 B2
(45) Date of Patent: Oct. 8, 2002

(54) IMAGE FORMING APPARATUS HAVING A MULTI-JOB FUNCTION AND METHOD OF USING SAME

(75) Inventors: Junko Takuwa, Nishinomiya; Hiroharu Tanaka; Yoichi Kawabuchi, both of Toyokawa; Koji Naito, Toyohashi; Hiroshi Sugiura, Aichi-ken, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/809,167

(22) Filed: Mar. 16, 2001

(65) Prior Publication Data

US 2002/0015599 A1 Feb. 7, 2002

(30) Foreign Application Priority Data

Mar. 16, 2000 (JP) ........................................ 2000-074625

(51) Int. Cl.[7] .............................................. G03G 15/00
(52) U.S. Cl. .............................. 399/82; 399/81; 399/87
(58) Field of Search .............................. 399/82, 85, 87, 399/43, 16, 9, 81; 358/1.13, 437

(56) References Cited

U.S. PATENT DOCUMENTS 5,669,040 A * 9/1997 Hisatake .................... 399/82 X
5,774,356 A    6/1998 Hisatake et al.
5,815,280 A    9/1998 Ohmura et al.
5,930,462 A    7/1999 Iwasaki et al.

FOREIGN PATENT DOCUMENTS

JP    04057566 A    2/1992
JP    05-134511 A   5/1993

* cited by examiner

Primary Examiner—Sophia S. Chen
(74) Attorney, Agent, or Firm—Burns, Doane, Swecker & Mathis, LLP

(57) ABSTRACT

The image forming apparatus is capable of storing a plurality of jobs in memory, and the stored plurality of jobs are printed and output in the storage sequence. A permitted time for exclusive use of the image forming apparatus to print a first job (print time upper limit) can be set and changed by a user using an operation panel. When the permitted time has elapsed after starting printing of the first job, the first job is interrupted and printing of another job is started. This arrangement prevents delaying the printing of other jobs due to the continuous printing of the first job over a long time period.

16 Claims, 18 Drawing Sheets

IMAGE FORMING APPARATUS HAVING A MULTI-JOB FUNCTION AND METHOD OF USING SAME

CROSS-REFERENCE TO RELATED APPLICATION

This application is based on Patent Application 2000-74625 filed in Japan, the content of which is hereby incorporated by reference.

BACKGROUND OF THE INVENTION

1. Field of the Invention

The present invention relates to an image forming apparatus, and specifically relates to an image forming apparatus having a multi-job function capable of storing and executing a plurality of jobs in a specified sequence.

2. Description of the Related Art

Conventional image forming apparatuses are known which are capable of recording a plurality of jobs within the apparatus and executing these jobs sequentially such as copiers, facsimile machines, printers, and multi functions devices combining these functions. In such image forming apparatuses, a reading operation to read another document can be executed even during execution of a print operation. Furthermore, after one print operation has been completed, the printing of another document recorded in the device may be automatically executed.

In addition, the image forming apparatus may be jointly used by a plurality of users when connected to a network.

Disadvantages arise in conventional image forming apparatuses, however, inasmuch as the output development time of a single job of a single user (this output includes data RIP (raster image processor: required size and position of text and images expressed in mathematical expressions and postscript programming language, developed as a painted bitmap) development time, data readout time, and document reading time) takes a long time, and the output of small volume print jobs and rush print jobs are delayed until later. In the conventional art, work efficiency is poor because an image forming apparatus may be monopolized exclusively by the output of a single job during periods of high frequency usage.

OBJECTS AND SUMMARY

An object of the present invention is to eliminate the previously described disadvantages by providing an image forming apparatus which is not exclusively monopolized over a long period by a single job.

Another object of the present invention is to provide an image forming apparatus capable of controlling the operation of the apparatus in accordance with the time the image forming apparatus is used.

A first aspect of the present invention provides, in an image forming apparatus, a first timer for timing the exclusive use time of the apparatus to complete a first job currently executing, a comparator for comparing the measured exclusive use time to a previously set threshold value, and a controller for controlling the execution of a second job different from the first job based on the comparison result of the comparator.

A second aspect of the present invention provides, in an image forming apparatus, a first determination device for determining whether or not the current time zone is included in a specified time zone, a second determination device for determining whether or not the number of printed sheets of a currently executing first job has exceeded a previously set threshold value, and a controller for controlling the execution of a second job different from the first job based on the determination results of the first determination device and the second determination device.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

The embodiments of the present invention are described hereinafter with reference to the accompanying drawings.

First Embodiment

Figure 1:
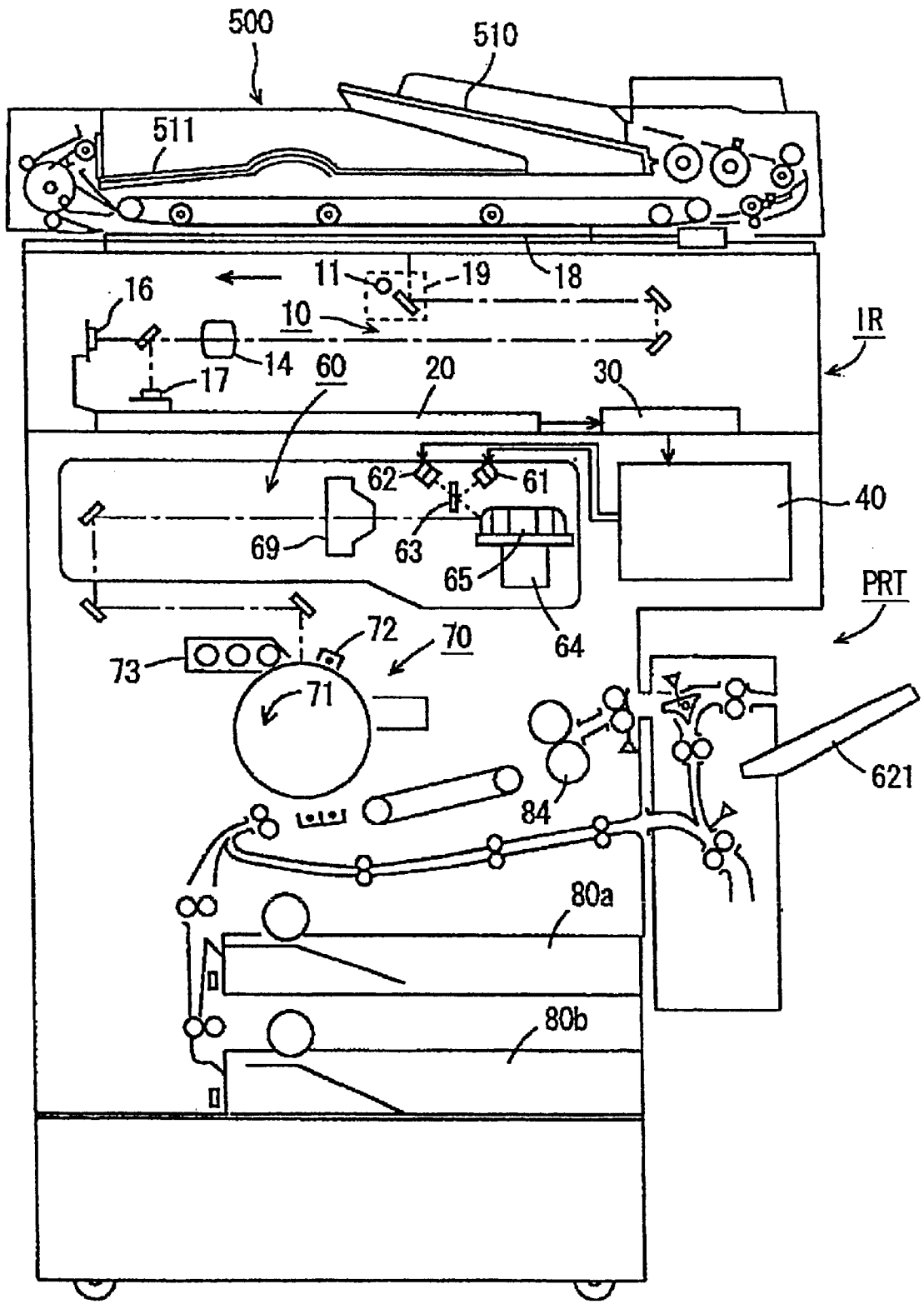
FIG. 1 is a cross section view of an image forming apparatus of a first embodiment of the present invention.

FIG. 1 is a cross section view of an image forming apparatus of a first embodiment of the present invention.

Referring to the drawing, the image forming apparatus comprises a scanner 10 for reading a document and converting it to image data, image processor 20 for processing the image data transmitted from the scanner, image memory 30 for storing image data input from the image processor 20, print processor 40 for driving two semiconductor lasers 61 and 62 based on image data input from the image memory 30, optical unit 60 for directing the two laser beams emitted from the semiconductor lasers 61 and 62 to mutually different exposure positions on a photosensitive drum 71, image forming unit 70 for forming an image by developing the latent image formed by the exposure light and transferring the image to a copy sheet and fixing the image thereon, document feeder for transporting and reversing a document front-to-back as necessary, and a sheet re-feeder for re-feeding a copy sheet to the transfer position.

A reading unit IR comprises the scanner 10 and image processor 20 and the like, and a printing unit PRT comprises the print processor 40, optical unit 60, image forming unit 70 and the like.

The image of a document placed on a document glass 18 is illuminated by an exposure lamp 11 mounted on a scanner 19 moving below the document glass. Light reflected from the document passes through a condenser lens 14, and is converted to electrical signals by photoelectric conversion elements 16 and 17 using CCD arrays or the like. These electrical signals are transmitted to the image processor 20 as image data for processing.

The document feeder 500 places a document set on a document feed tray 510 automatically on the document glass 18. After the document has been read by the reader IR, the document is automatically ejected to a document discharge tray 511. The image data read by the reader IR are processed by the image processor 20, and stored in the image memory 30.

In the printer PRT, the image data output from the image memory 30 are transmitted to the semiconductor lasers 61 and 62 via the print processor 40. Laser beams are output from the semiconductor lasers 61 and 62 and these laser beams are combined by a dichroic mirror 63, and reflected by a polygonal mirror 65 which is rotated by a motor 64. The reflected light passes through a main lens 69 and illuminates the photosensitive drum 71.

The photosensitive drum 71 is charged by a charger 72. The charged photosensitive drum 71 is illuminated by the laser light, which forms a latent image on the surface of the photosensitive drum 71. The latent image is developed by adhering toner from a developing device 73. The toner image on the surface of the photosensitive drum 71 is transferred onto a sheet supplied from a cassette 80a or 80b, and the toner image is fixed to the sheet by applying heat and pressure via a fixing device 84, then the sheet is discharged to the discharge tray 621.

The image forming apparatus is capable of storing a plurality of jobs in memory, and the stored plurality of jobs are printed and output in the storage sequence.

Figure 2:
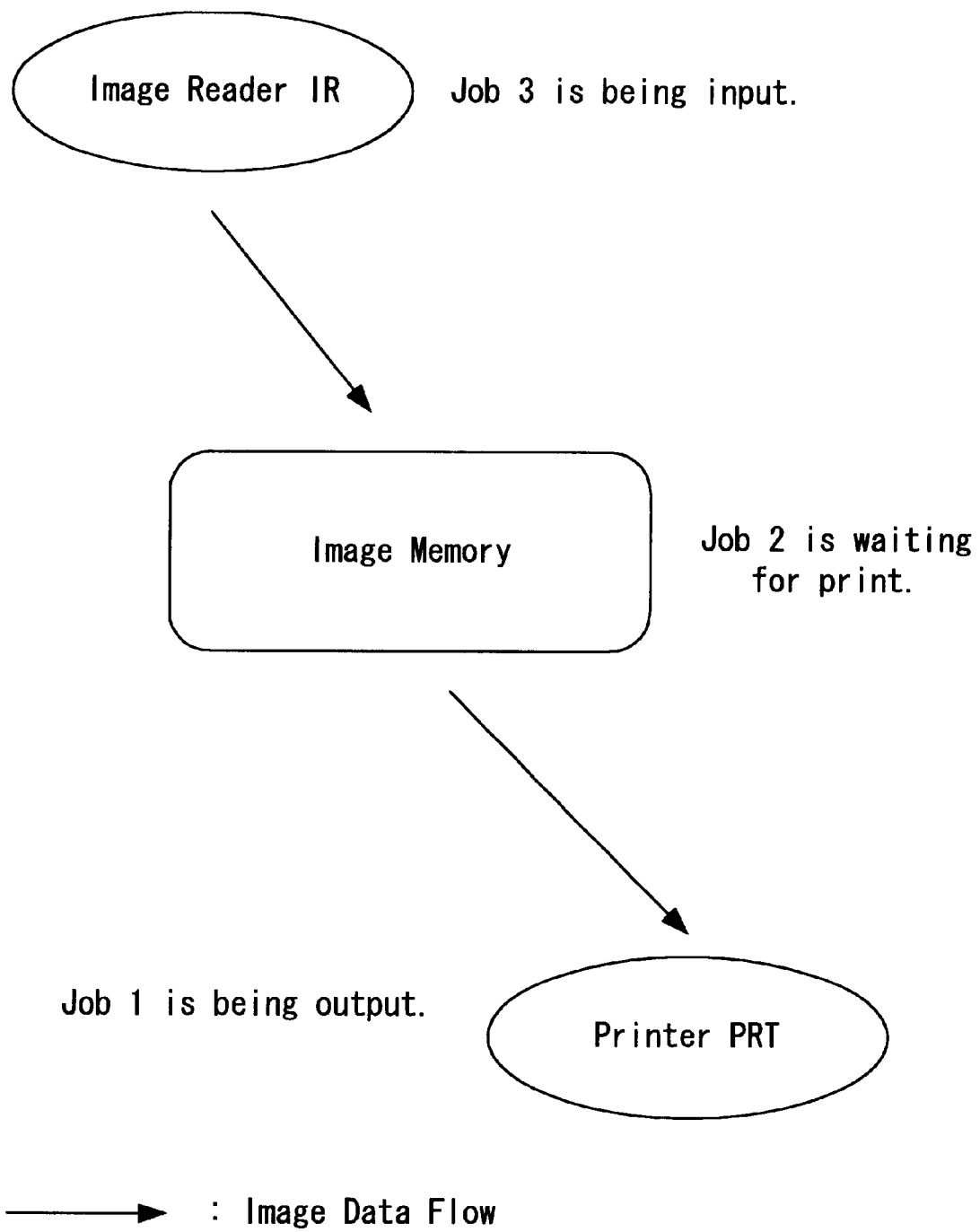
FIG. 2 illustrates a multiple job function.

FIG. 2 illustrates the multi job operation.

In a digital image forming apparatus having an image memory, the image of a new job can be input while the image of one job in the image memory is being output by the printer PRT. For example, in a digital copier, a new set of document images can be read by the image reader IR and stored in the image memory as a new job via specifications previously set from the operation panel during the output of one job.

That is, while a job (JOB) 1 is being output by the printer PRT, a document set different from the job 1 (i.e., a job 2 or job 3) can be read by the image reader IR because the printing and reading operations are performed independently.

The image forming apparatus may be connected to a network so as to receive image data from a personal computer through a peripheral interface, and these image data can be stored in the image memory as a single job.

Figure 3:
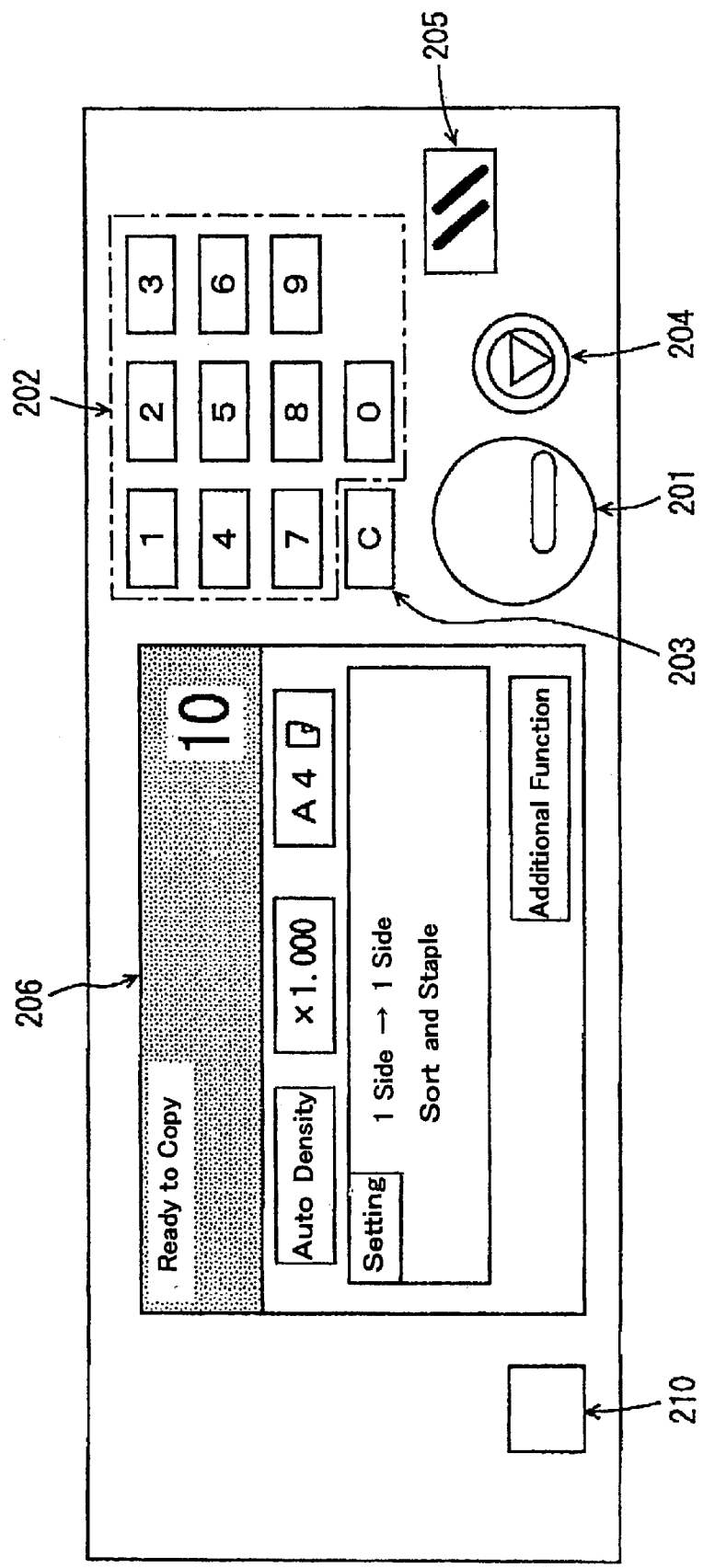
FIG. 3 is a plane view of the operation panel of the image forming apparatus.

FIG. 3 is a plane view of an operation panel provided on the image forming apparatus of FIG. 1.

Referring to the drawing, the operation panel is provided with a start key 201 for starting an operation, a ten-key pad 202 for inputting numbers such as the copy number, clear key 203 for erasing image data stored in the image memory 30 by clearing the input numeric values, stop key 204 for stopping an operation, panel reset key 205 for canceling a set job and mode, liquid crystal display (LCD) 206 for displaying the various modes, and an exclusive use time setting key 210 for setting the upper limit value (threshold) of the exclusive use time (also referred to as "print time") for printing a single job.

A touch panel is mounted on the front of the liquid crystal display 206, to allow a user to perform input operation in accordance with the display of the liquid crystal display 206.

Figure 4:
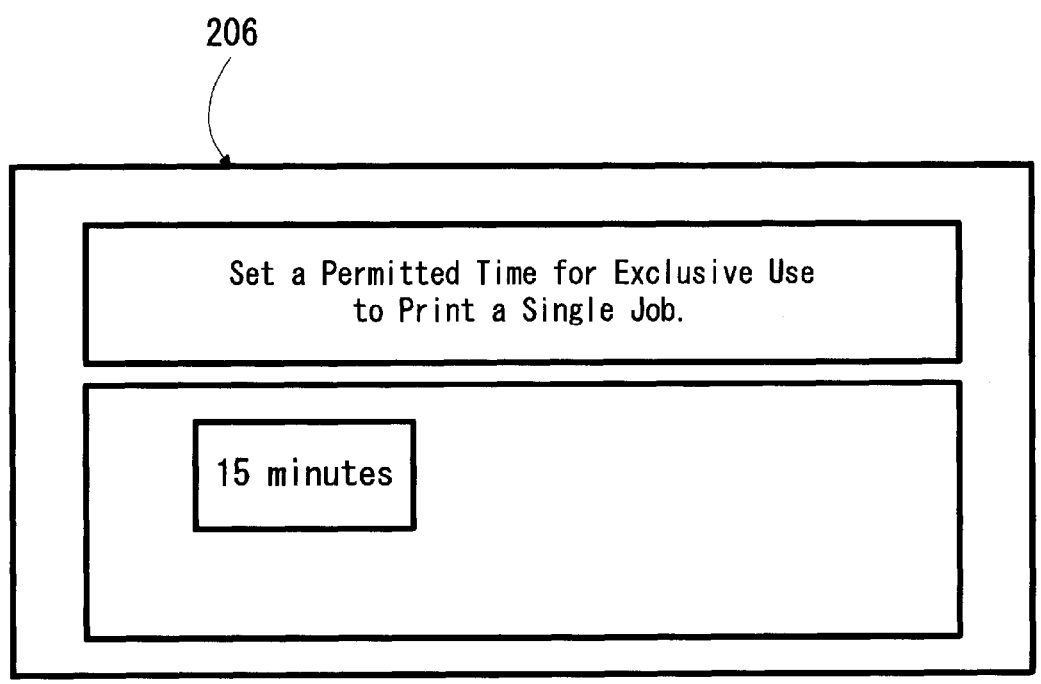
FIG. 4 shows the setting screen for setting the exclusive use time of a job.

FIG. 4 shows a screen displayed on the liquid crystal display 206 after the exclusive use time setting key 210 of FIG. 3 has been pressed.

Referring to the drawing, the permitted time for exclusive use of the image forming apparatus to print a single job (print time upper limit) on the screen shown in the drawing can be set and changed by a user using the ten-key pad 202. That is, in FIG. 4, 15 minutes is set as the time for exclusive use of the image forming apparatus to print a single job. For this reason when 15 minutes has elapsed after starting printing of a single job, the job is interrupted and printing of another job is started. This arrangement prevents delaying the printing of other jobs due to the continuous printing of a single job over a long time period.

The exclusive use time of the image forming apparatus may include not only the exclusive use time of the actual printing operation, but may also include data RIP (raster image processor: required size and position of text and images expressed in mathematical expressions and postscript programming language, developed as a painted bitmap) development time, data readout time, and the exclusive use time for reading of the document by the image reader IR.

Furthermore, when the printer does not have an image reader IR, the image forming apparatus need not include the exclusive use time for reading a document.

Figure 5:
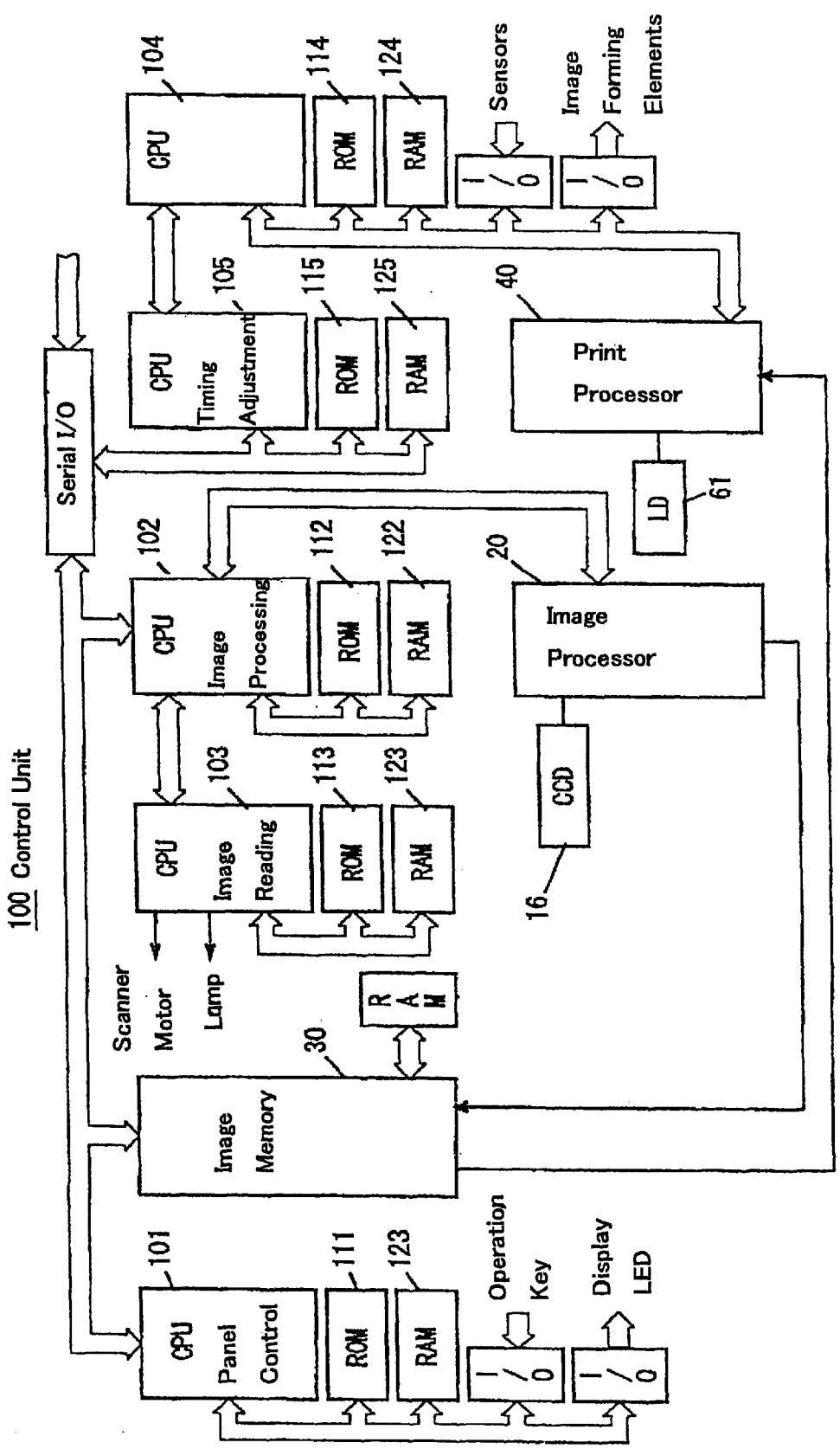
FIG. 5 is a block diagram showing the circuit structure of the image forming apparatus.
Figure 6:
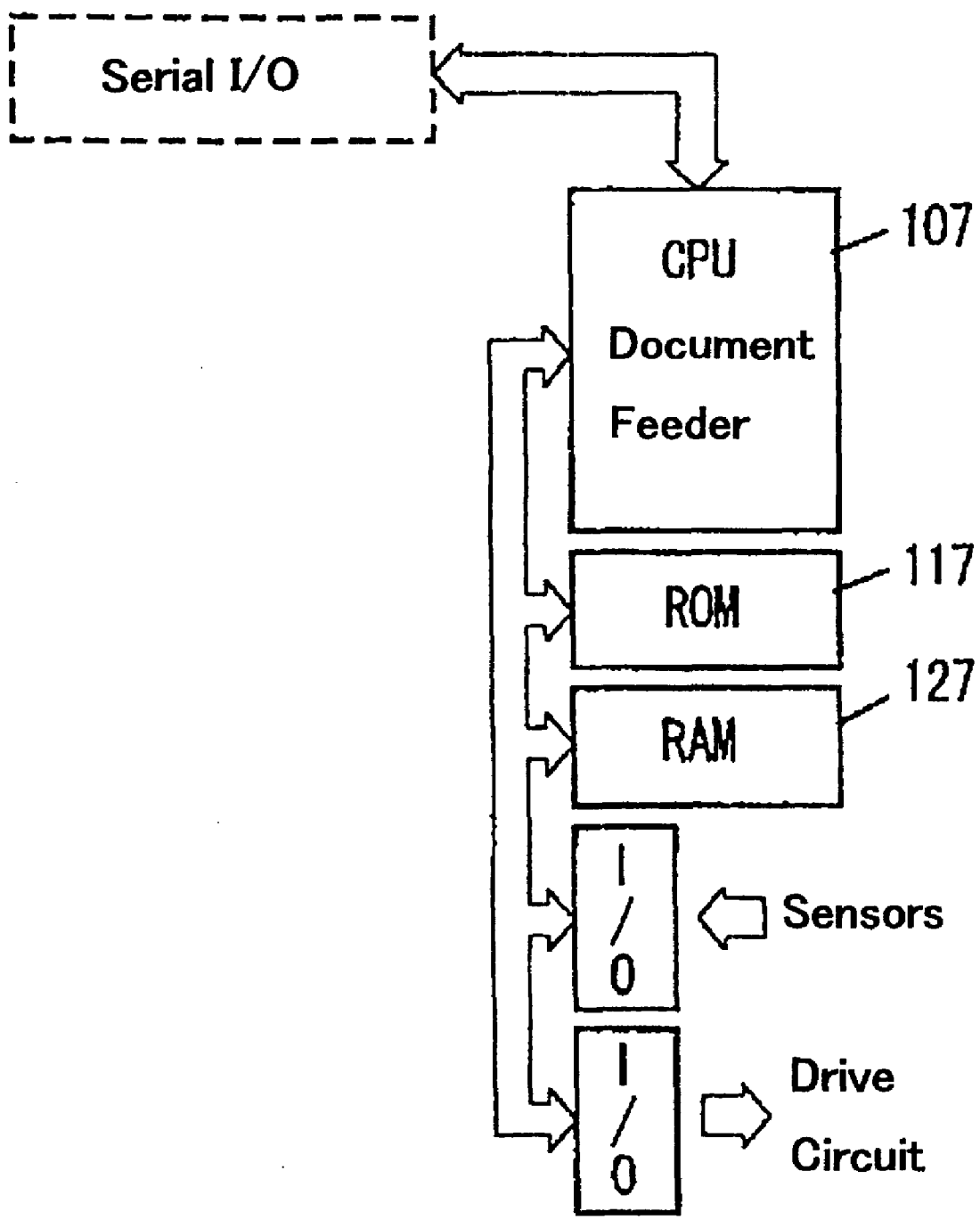
FIG. 6 is a block diagram continued from FIG. 5.

FIGS. 5 and 6 are block diagrams showing the circuit structure of the control unit 100 provided in the image forming apparatus of FIG. 1. Referring to the drawing, the controller has CPUs 101–105 and 107 at its center, each CPU 101–105 and 107 is respectively provided with ROM 111–115 and 117 for storing necessary programs, and RAM 121–125 and 127 used as work areas for program execution.

The CPU 101 controls the input of signals from the various keys the operation panel for display on the liquid crystal display 206. The CPU 102 controls the various components of the image processor 20. The CPU 103 controls the drive of the scanner 10.

The CPU 104 controls the print processor 40, optical unit 60, image forming unit 70, and sheet transport unit. The detection signals from sheet detection sensors provided at various locations are input to the CPU 104 through an I/O.

The CPU 105 controls the overall timing adjustment of the control unit, and the operation mode settings. A CPU (not illustrated) is included in the image memory 30, and processes image data transmitted from the image processor as necessary to generate print data. The generated print data are then transmitted to the print processor 40.

The CPU 107 controls the document feeder 500, and is connected to the CPUs 101, 102, and 105 via a serial I/O. Specifications of document feeding, transport, and discharge are executed by the CPU 105.

Figure 7:
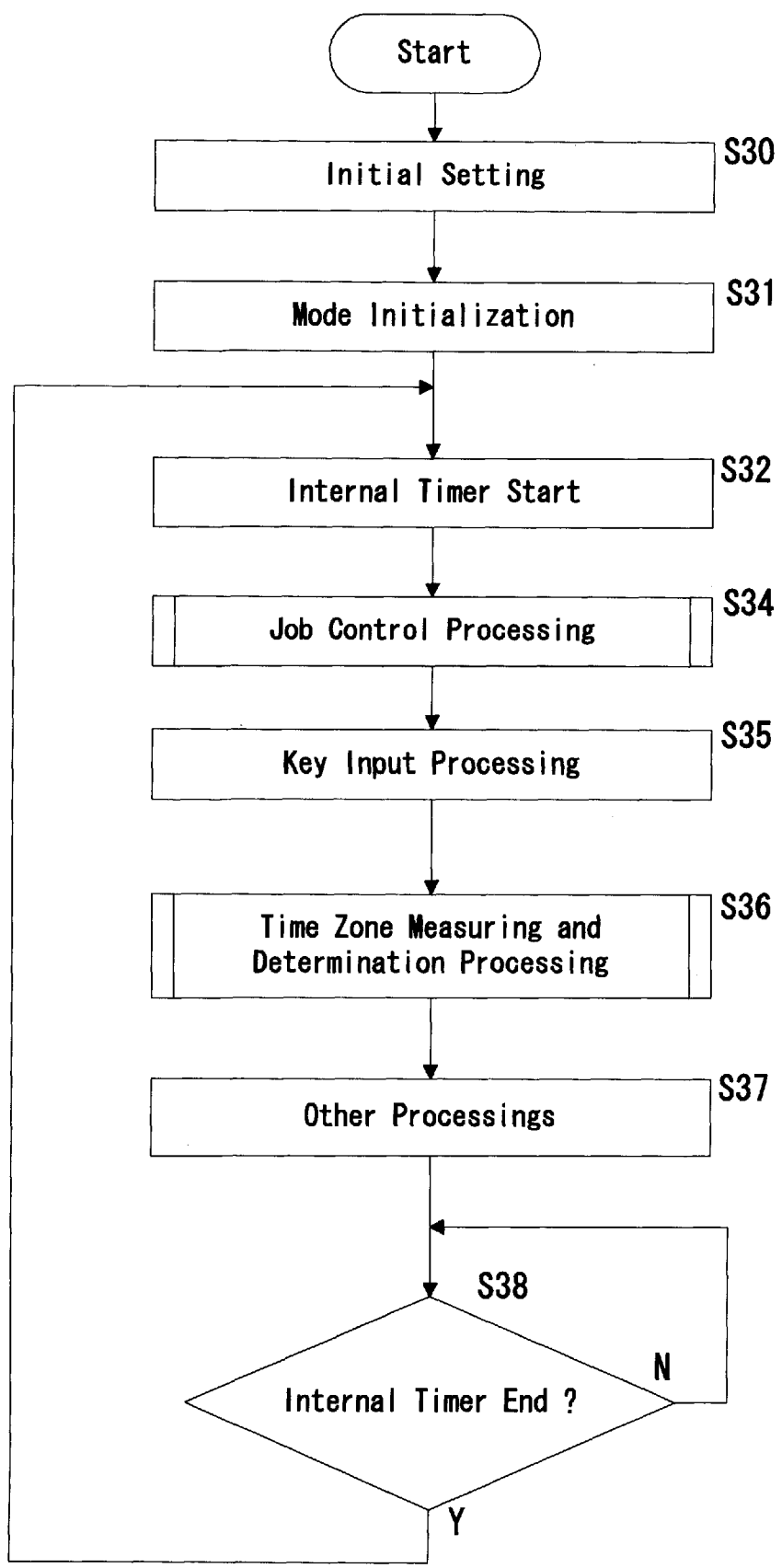
FIG. 7 is a main flow chart showing the basic operation of the image forming apparatus.

FIG. 7 is a flow cart showing the main routine executed by the CPU 105.

When the CPU 105 is reset and the program starts, first the RAM is cleared, and each type register and setting of the CPU is initialized (step S30). Thereafter, the initialization process of the operation mode of the image forming apparatus is executed (step S31).

Next, an internal timer built in the CPU is started (step S32). The value of the internal timer is set to an initial value by an initial setting beforehand.

Then, various processes are sequentially executed including a job control process is executed to control the starting and stopping of jobs (step S34), key the routine advances to step #1207 and the temporarily interrupted printing of job 1 is restarted.

The details of the job control process and the time zone counting and determination process are described later.

When all processes are completed, the end of the internal timer set initially is awaited (step S38), and when on-routine ends, the routine returns to step S32. Various timer counts are executed and recorded during subroutines using the length of time of one-routine. That is, each timer counts the time during which one-routine is repeated a number of times.

Figure 8:
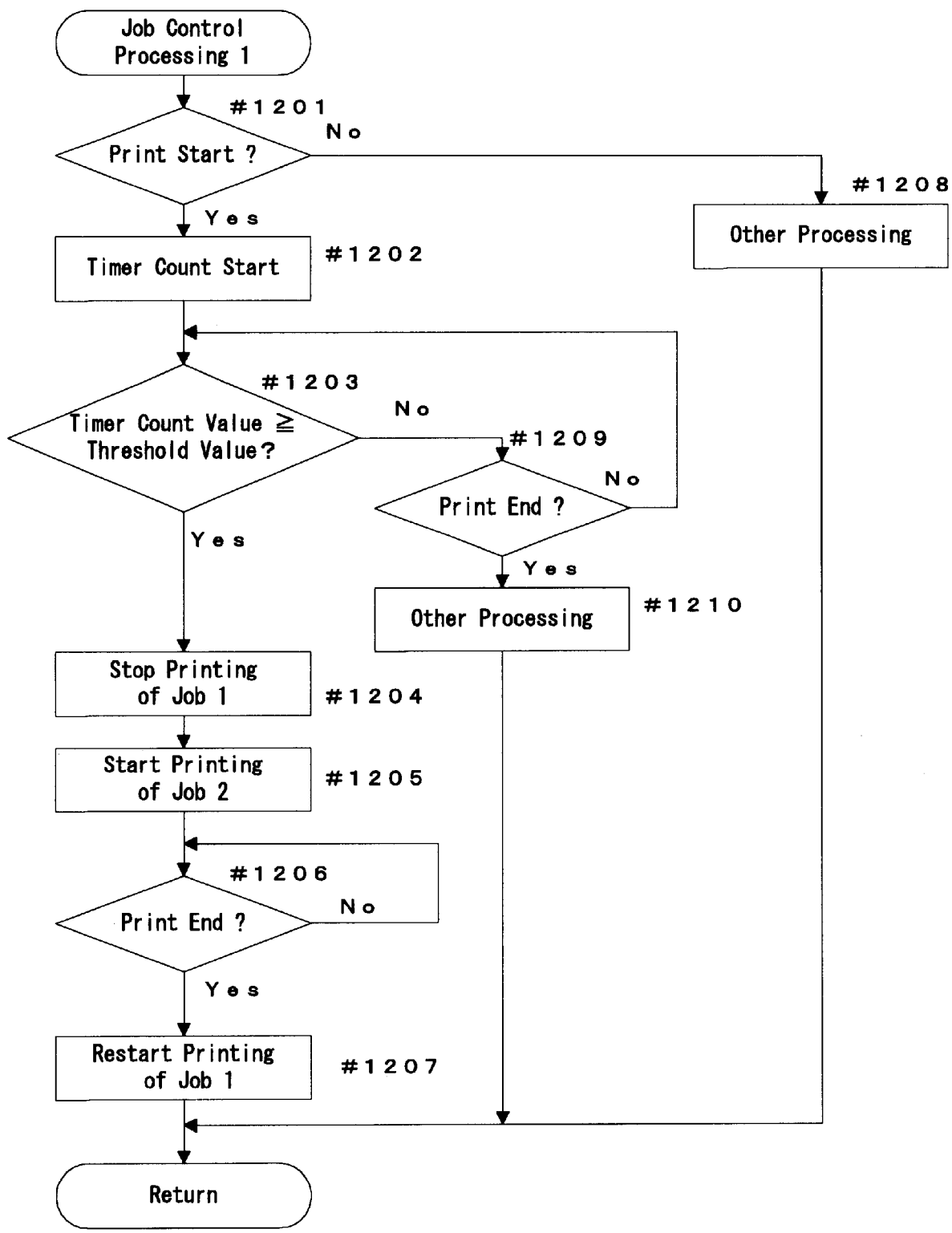
FIG. 8 is a flow chart showing the subroutine of the job control process.

FIG. 8 is a flow chart of the job control process 1 executed in step S34 of FIG. 7. In this subroutine, an interruption process for another job is executed when the time from the start of printing exceeds a threshold value (i.e., the upper limit of permitted time for a single job).

Referring to the drawing, in step #1201, a determination is made as to whether or not a print operation was started by the start key 201. If the determination is YES, then the timer count is started in step #1202. Next, in step #1203, a determination is made as to whether or not the timer count value has exceeded a threshold value (i.e., the upper limit value of the print time set on the screen in FIG. 4). If the determination is YES, the job (job 1) being printed is temporarily stopped in step #1204. In step #1205 the printing of a next job (job 2) is started.

In step #1206 a determination is made as to whether or not the printing of job 2 has ended, and the end of printing job 2 is awaited. When the printing of job 2 ends, the temporarily stopped printing of job 1 is restarted in step #1207.

When the timer count value does not exceed the threshold value in step #1203, a determination is made in step #1209 as to whether or not the currently printing job is completed, and when the determination is YES, other processes are executed in step #1210. When the determination is NO in step #1209, the routine returns to step #1203.

When the determination is NO in step #1201, other processes are executed in step #1208.

In the present embodiment the print operation of a currently printing job (job 1) and the print operation of a different job (job 2) are controlled based on a comparison of a threshold time and a timer count value. In this way a single job does not have exclusive use of the image forming apparatus for a long time period, and the image forming apparatus is used more efficiently by the users.

Instead of comparing the time required for job 1 with a threshold value in steps #1202 and #1203, the processes of step #1204 and subsequent steps may be executed when the number of pages to be printed in job 1 are counted and found to exceed a threshold value.

The subroutine of the time zone measuring and determination process of step S36 of the main routine of FIG. 7 is described below with reference to FIGS. 9 and 10. In this subroutine, the time zone of peak use of the image forming apparatus is automatically determined.

The time zone of peak use of the image forming apparatus determined in this subroutine is used in the job control process of the second, eighth, and ninth embodiments described later.

Figure 9:
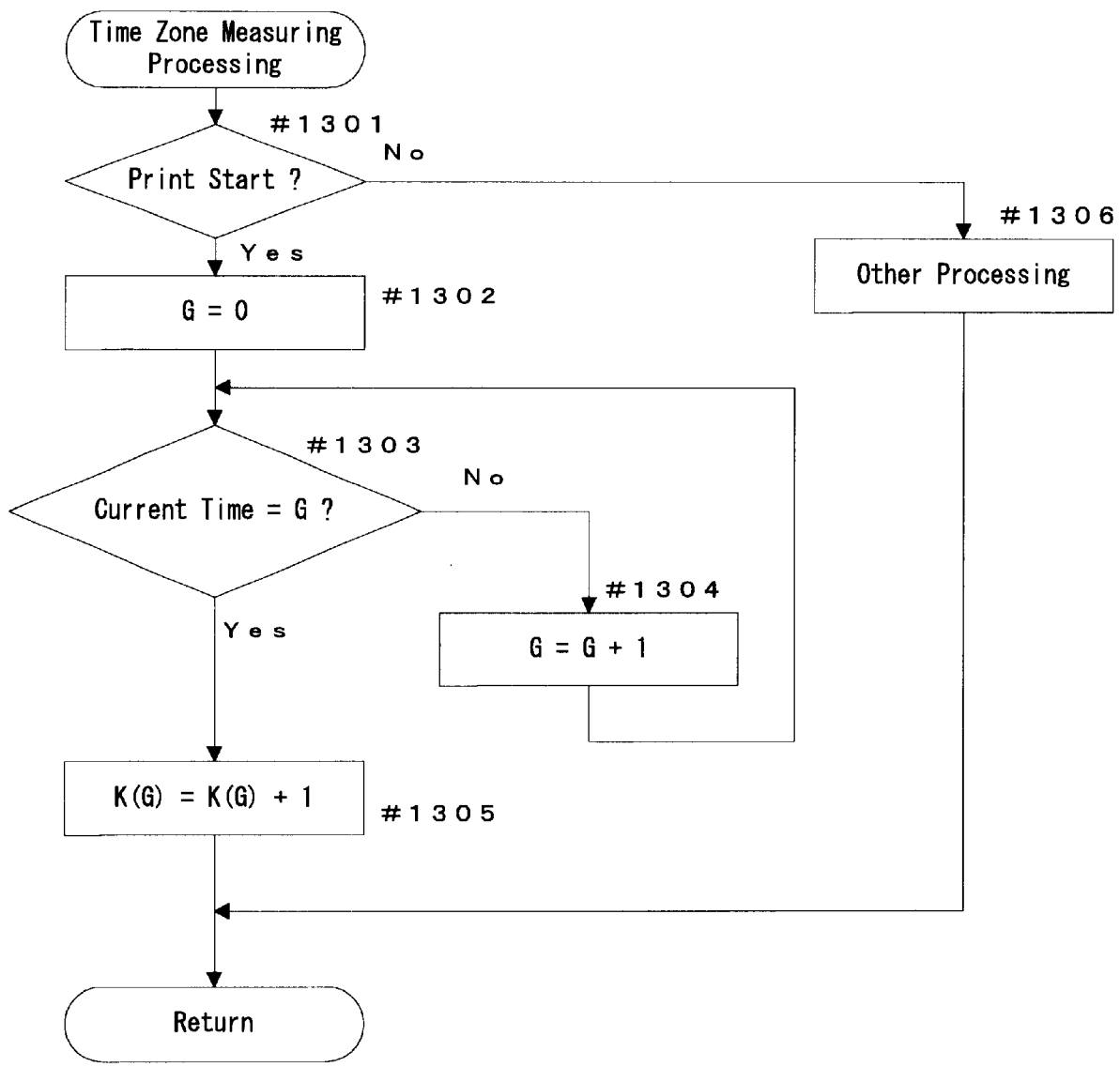
FIG. 9 is a flow chart showing the subroutine of the time zone measuring process.

FIG. 9 is a flow chart of the process for measuring the time zone of peak use of the image forming apparatus, and is a subroutine executed in step S36 of FIG. 7.

Referring to FIG. 9, in step #1301 a determination is made as to whether or not printing has started; if the determination is YES, a variable G is set at [0] in step #1302. The variable G may be a value of 0~24, and represents a 24 hr time period from hour 0 to hour 24.

In step #1303 a determination is made as to whether or not the current time is equal to the value G, and if the determination is YES, the value of variable K (G) is incremented [1] in step #1305.

On the other hand, when the determination in step #1303 is NO, the value of G is incremented [1] in step #1304, and the routine returns to step #1303. For example, when the current time is hour 11, the processes of steps #1303 and #1304 are executed until G=11.

When the determination in step #1301 is NO, other processes are executed in step #1306.

Figure 10:
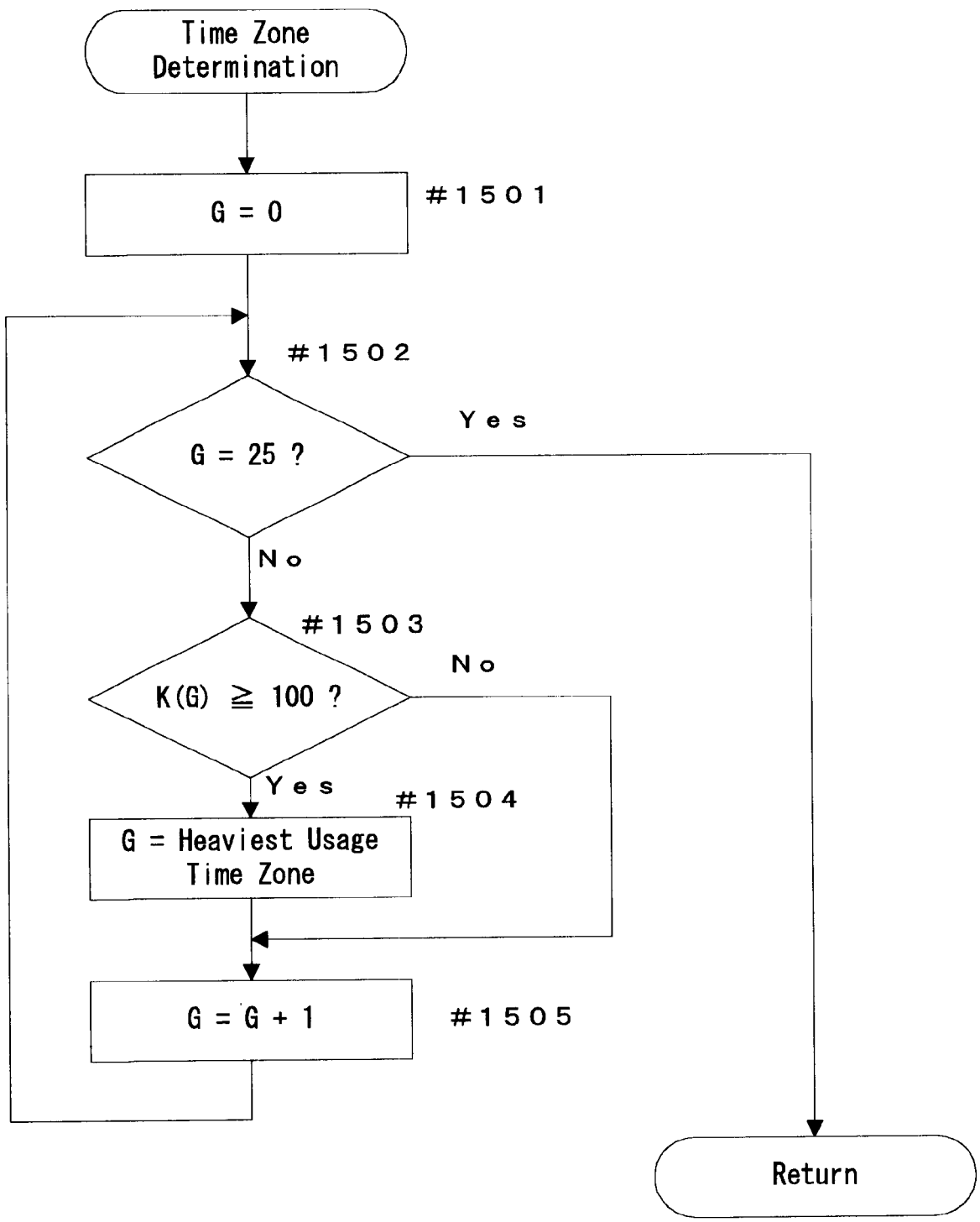
FIG. 10 is a flow chart showing the subroutine of the time zone determination process.

FIG. 10 is a flow chart of the process for determining the time zone of peak use of the image forming apparatus, and is a subroutine executed in step S36 of FIG. 7.

Referring to FIG. 10, the value of variable G is set at [0] in step #1501. In step #1502, a determination is made as to whether or not G=25, and when the determination is NO, a determination is made in step #1503 as to whether or not the value of variable K (G) is 100 or greater.

When the determination in step #1503 is YES, the time represented by the current value G is designated the time zone of heaviest usage of the image forming apparatus in step #1504, and in step #1505 the variable G is incremented [1], and the routine returns to step #1502.

When the determination in step #1503 is NO, the routine advances directly to step #1505, and when the determination in step #1502 is YES, this process ends.

Second Embodiment

The image forming apparatus of the second embodiment is provided with a construction identical to that of the first embodiment shown in FIGS. 1~7, 9, and 10. Therefore description of the construction shown in these drawings is omitted. In the second embodiment, the job control process 1 of FIG. 8 is replaced by the job control process 2 shown in FIG. 11. In this embodiment, the time zone of peak use of the image forming apparatus is automatically determined, and the printing of jobs is controlled based on whether or not the current time is included in the time zone of peak use of the image forming apparatus. In the time zone of peak use of the image forming apparatus, the time is restricted during which a single job has exclusive use of the printer.

Figure 11:
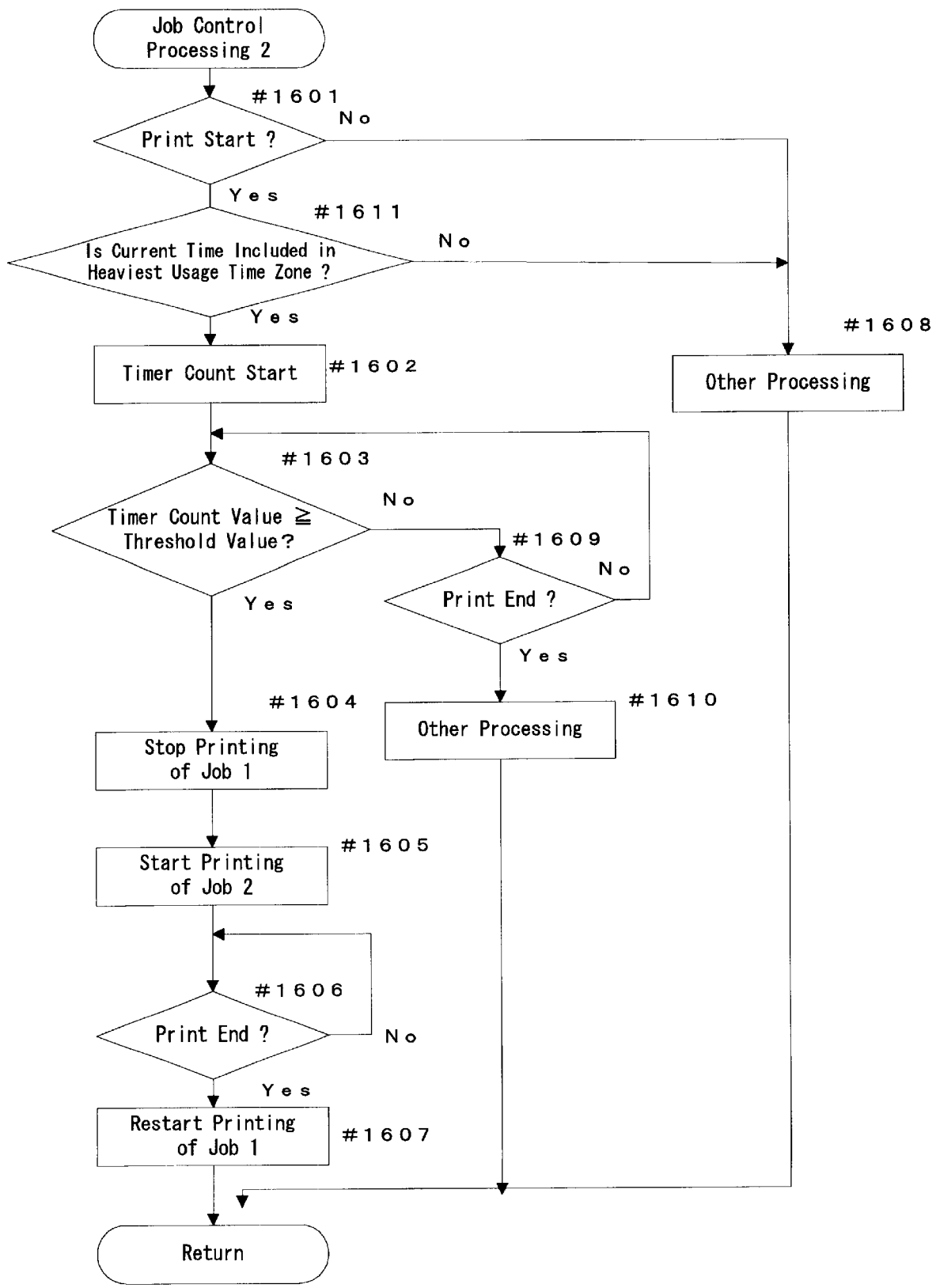
FIG. 11 is a flow chart showing the subroutine of the job control process of a second embodiment.

FIG. 11 is a flow chart of the job control process 2 executed in step S34 of FIG. 7. In this subroutine, an interrupt process for processing other jobs is executed when the current time is included in the time zone of peak use of the image forming apparatus and the time from the start of printing exceeds a threshold value (i.e., the upper limit of the permitted time for a single job).

Referring to the drawing, the processes executed in steps #1601~1610 of the flow chart are identical to the processes executed in steps #1201~1210 of FIG. 8, and their descriptions are not repeated.

In the present embodiment, when a print start request is issued in step #1601, a determination is made in step #1611 as to whether or not the current time is included in the time zone of peak use of the image forming apparatus. If the determination is YES, the routine advances to step #1602, whereas if the determination is NO the routine advances to step #1608.

In this way the time from the start of a currently executing job is measured, and the currently executing job is interrupted and a new job is started only when the current time is included in the time zone of peak use of the image forming apparatus. The image forming apparatus is used more efficiently by the users via this process.

Third Embodiment

The image forming apparatus of the third embodiment is provided with a construction identical to that of the first embodiment shown in FIGS. 1~7, 9, and 10. Therefore description of the construction shown in these drawings is omitted. In the third embodiment, the job control process 1 of FIG. 8 is replaced by the job control process 3 shown in FIG. 12.

Figure 12:
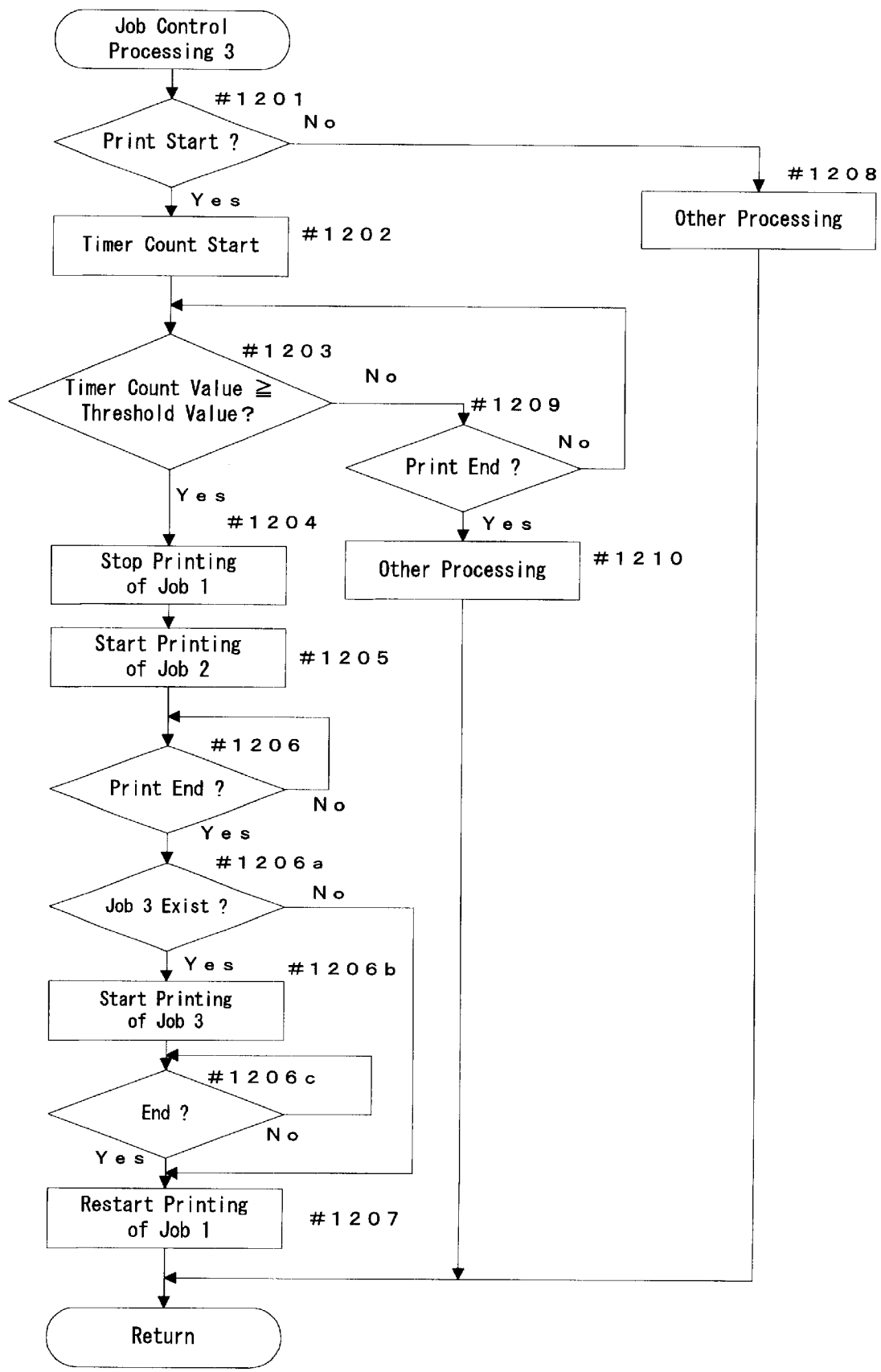
FIG. 12 is a flow chart showing the subroutine of the job control process of a third embodiment.

FIG. 12 is a flow chart of the job control process 3 executed in step S34 of FIG. 7. The processes of steps #1201~#1210 in the flow chart of FIG. 12 are identical to the processes of steps #1201~#1210 of FIG. 8 and their description is not repeated.

In the present embodiment, when it is determined in step #1206 that the printing of job 2 is completed, the routine advances to step #1206a, and a determination is made as to whether or not another job (job 3) is recorded in the apparatus. When another job is recorded, the printing of job 3 starts in step #1206b, and the end of the printing of job 3 is awaited in step #1206c; when the printing of job 3 is completed the routine advances to step #1207, and the printing of the interrupted job 1 is restarted.

In this embodiment, after the printing of job 2 is completed, the printing of other standby jobs may be given priority over job 1.

Fourth Embodiment

The image forming apparatus of the fourth embodiment is provided with a construction identical to that of the first embodiment shown in FIGS. 1~7, 9, and 10. Therefore, description of the construction shown in these drawings is omitted. In the fourth embodiment, the job control process 1 of FIG. 8 is replaced by the job control process 4 shown in FIG. 13.

Figure 13:
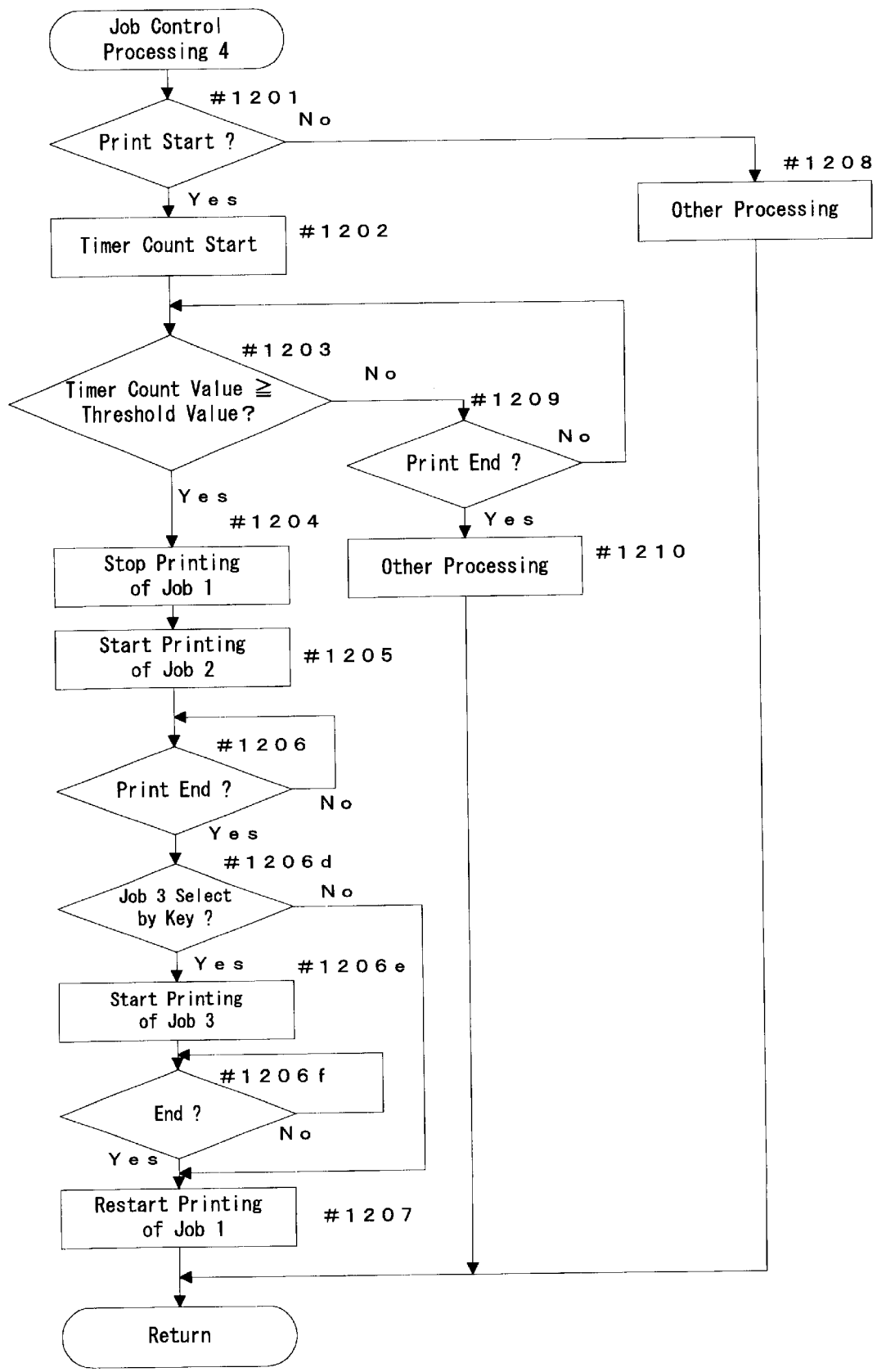
FIG. 13 is a flow chart showing the subroutine of the job control process of a fourth embodiment.

FIG. 13 is a flow chart of the job control process 4 executed in step S34 of FIG. 7.

The processes of steps #1201~#1210 in the flow chart of FIG. 13 are identical to the processes of steps #1201~#1210 of FIG. 8 and their description is not repeated.

In this embodiment, when it is determined in step #1206 that the printing of job 2 is completed, a message indicating this completion is displayed on the liquid crystal display 206, and the user selects whether or not to restart the temporarily interrupted printing of job 1, or to give priority to the printing of another newly recorded job (job 3). When a user selects a job 3 via key input in step #1206d, the routine advances to step #1206e and printing of job 3 starts.

Then, a determination is made in step #1206f as to whether or not the printing of job 3 is completed, and when completed the routine advances to step #1207 and the temporarily interrupted printing of job 1 is restarted.

On the other hand, when the determination in step #1206d is NO, the routine advances directly to step #1207.

In the present embodiment, since a user selects whether or not to restart the temporarily interrupted printing of job 1, or to start printing of new job 3, the image forming apparatus is used more efficiently.

Fifth Embodiment

The image forming apparatus of the fifth embodiment is provided with a construction identical to that of the first embodiment shown in FIGS. 1~7, 9, and 10. Therefore, description of the construction shown in these drawings is omitted. In the fifth embodiment, the job control process 1 of FIG. 8 is replaced by the job control process 5 shown in FIG. 14.

Figure 14:
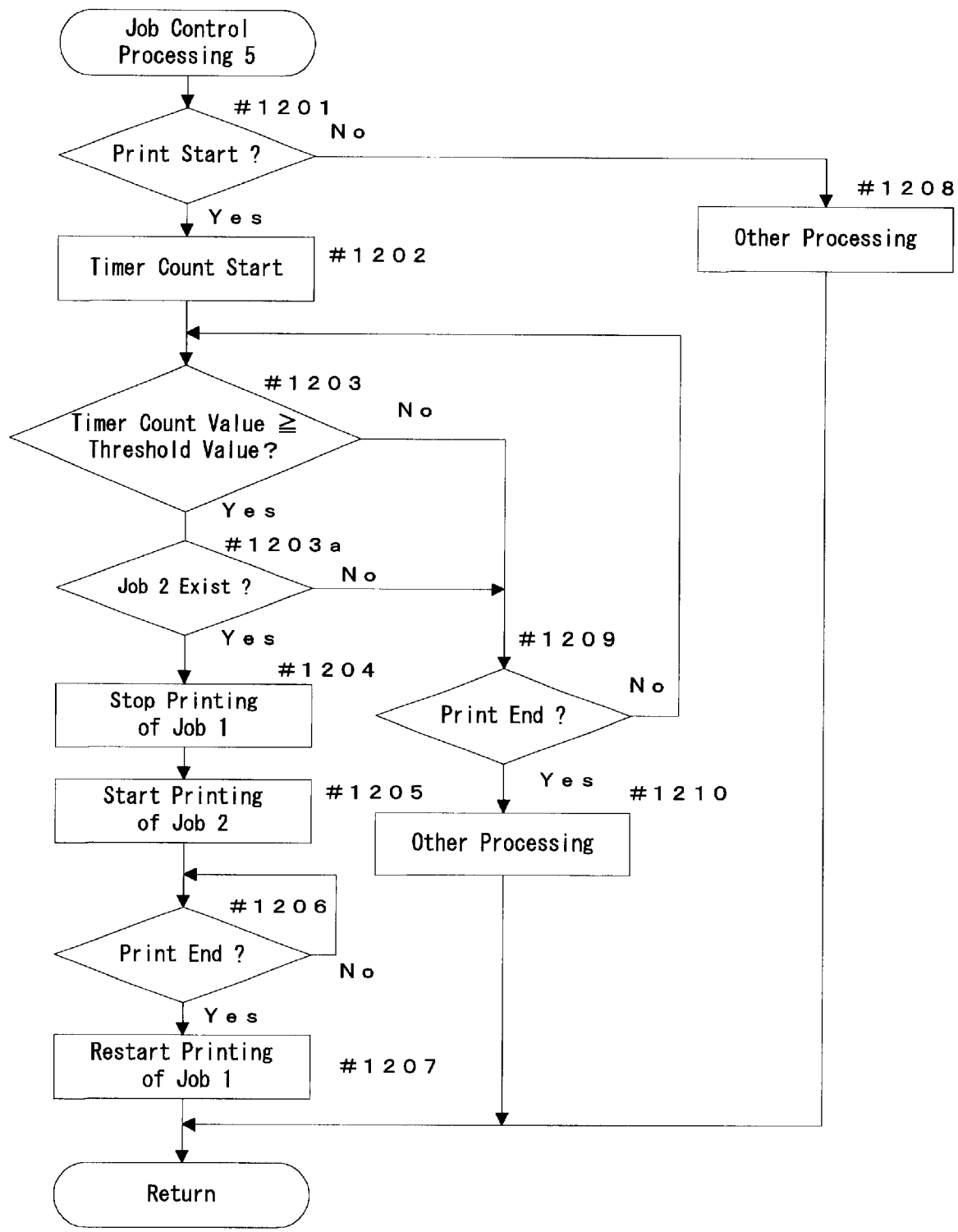
FIG. 14 is a flow chart showing the subroutine of the job control process of a fifth embodiment.

FIG. 14 is a flow chart of the job control process 5 executed in step S34 of FIG. 7.

The processes of steps #1201~#1210 in the flow chart of FIG. 14 are identical to the processes of steps #1201~#1210 of FIG. 8 and their description is not repeated.

In this embodiment, when the time count value exceeds a threshold value in step #1203, a determination is made as to whether or not a job 2 is recorded in the apparatus in step #1203a, and the processes from step #1204 and thereafter are executed only when the determination is YES.

On the other hand, when the determination is NO in step #1203a, the routine advances to step #1209 and the printing of job 1 continues.

In this embodiment, a determination is made as to whether or not job 2 different from job 1 is recorded (resent) in the apparatus, and the print operation is controlled based on the determination result. That is, even when a job 2 is not present when the time count value of job 1 exceeds the threshold value, but a job 2 is input during the printing operation of job 1, the printing of job 1 is interrupted and the printing operation of the newly input job 2 is started. In this way the image forming apparatus is operated more efficiently by the user.

Sixth Embodiment

The image forming apparatus of the sixth embodiment is provided with a construction identical to that of the first embodiment shown in FIGS. 1~7, 9, and 10. Therefore, description of the construction shown in these drawings is omitted. In the sixth embodiment, the job control process 1 of FIG. 8 is replaced by the job control process 6 shown in FIG. 15.

Figure 15:
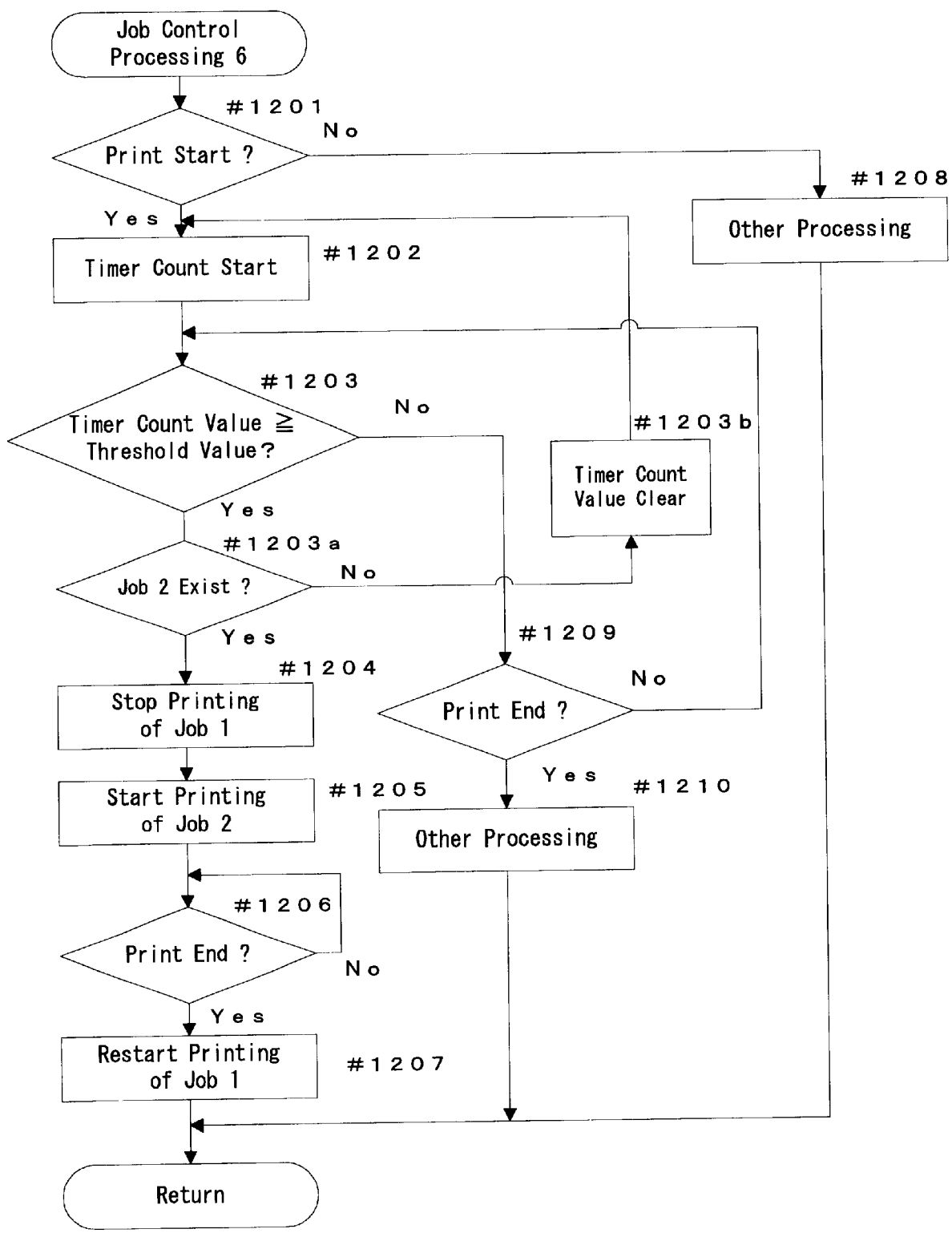
FIG. 15 is a flow chart showing the subroutine of the job control process of a sixth embodiment.

FIG. 15 is a flow chart of the job control process 6 executed in step S34 of FIG. 7.

The processes of steps #1201~#1210 in the flow chart of FIG. 15 are identical to the processes of steps #1201~#1210 of FIG. 8 and their description is not repeated.

In this embodiment, when it is determined that the time count value exceeds a threshold value in step #1203, a determination is made as to whether or not a new job (job 2) is recorded in the apparatus in step #1203a. If the determination is YES, the routine advances to step #1204. If the determination is NO, the time count value is cleared in step #1203b, and the routine moves to step #1202.

In this way, in the present embodiment, when a job 2 is present after the time count value has exceeded a threshold value, the count value of the timer is cleared, the printing time of job 1 starts recounting. In this way the image forming apparatus is used more efficiently by the users.

Seventh Embodiment

The image forming apparatus of the seventh embodiment is provided with a construction identical to that of the first embodiment shown in FIGS. 1~7, 9, and 10. Therefore, description of the construction shown in these drawings is omitted. In the seventh embodiment, the job control process 1 of FIG. 8 is replaced by the job control process 7 shown in FIG. 16.

Figure 16:
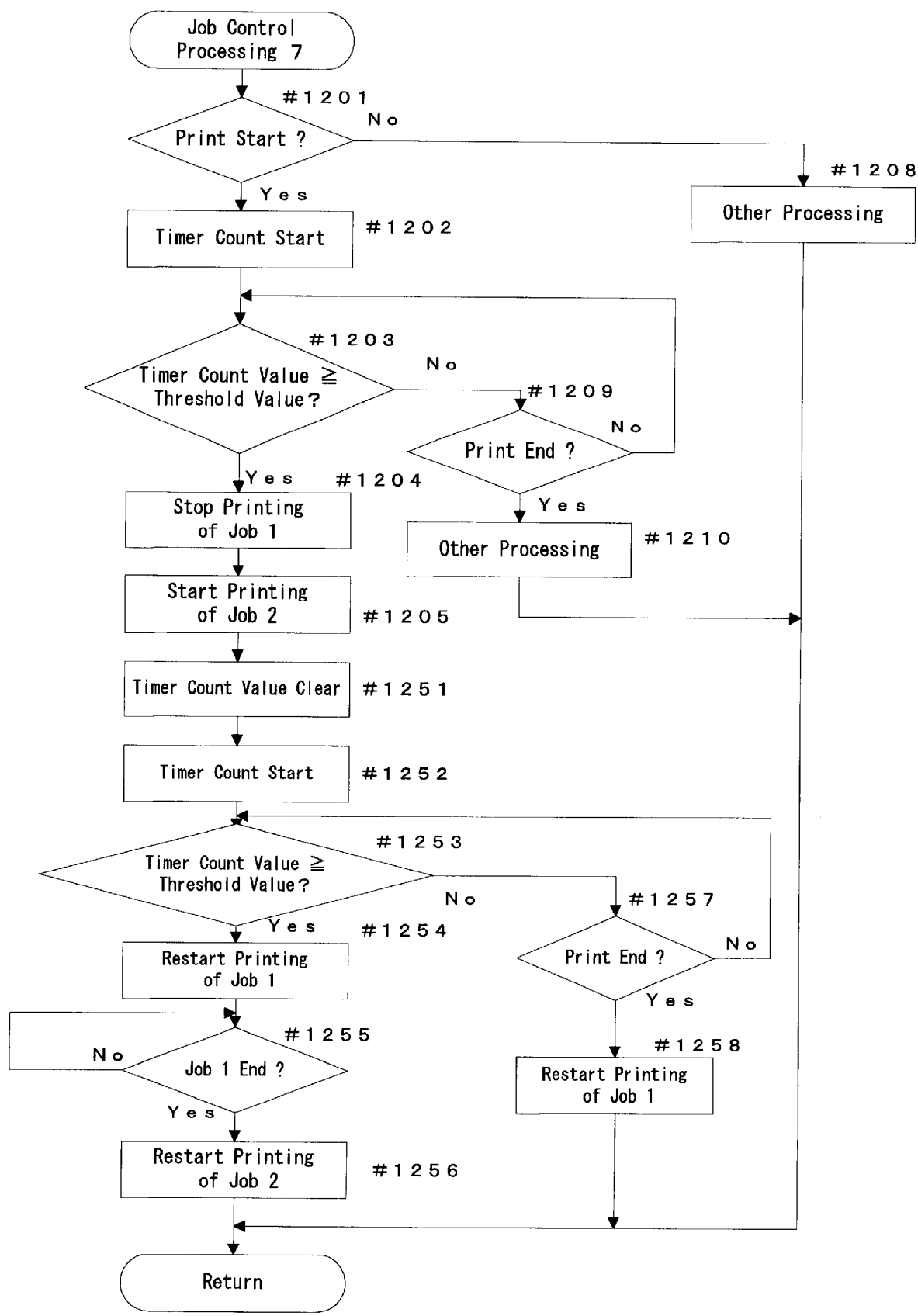
FIG. 16 is a flow chart showing the subroutine of the job control process of a seventh embodiment.

FIG. 16 is a flow chart of the job control process 7 executed in step S34 of FIG. 7.

The processes of steps #1201~#1205 and steps #1208~#1210 in the flow chart of FIG. 16 are identical to the processes of steps #1201~#1205 and steps #1208~#1210 of FIG. 8 and their description is not repeated.

In this embodiment, after the printing of job 2 is started in step #1205, the timer count value is cleared in step #1251. In step #1252 the timer is started, and in step #1253 a determination is made as to whether or not the timer count value exceeds a threshold value.

If the determination in step #1253 is YES, job 1 is restarted in step #1254. In step #1255, a determination is made as to whether or not the printing of job 1 is completed, and the completion of job 1 is awaited.

If the printing of job 1 is completed, the printing of job 2 is restarted in step #1256.

On the other hand, when the determination in step #1253 is NO, a determination is made in step #1257 as to whether or not the printing of job 2 is completed. If the printing of job 2 is completed, the printing of job 1 is restarted in step #1258. If the determination is NO in step #1257, the routine returns to step #1253.

In the present embodiment, the print time of a job 2 is counted during the printing of job 2 such that when the print time of job 2 exceeds a threshold value, the printing of job 2 is interrupted and the printing of job 1 is restarted. In this way the image forming apparatus is not used exclusively by the print job 2, and the apparatus sis used more efficiently by the user.

Eighth Embodiment

The image forming apparatus of the eighth embodiment is provided with a construction identical to that of the first embodiment shown in FIGS. 1~7, 9, and 10. Therefore, description of the construction shown in these drawings is omitted. In the eighth embodiment, the job control process 1 of FIG. 8 is replaced by the job control process 8 shown in FIG. 17.

Figure 17:
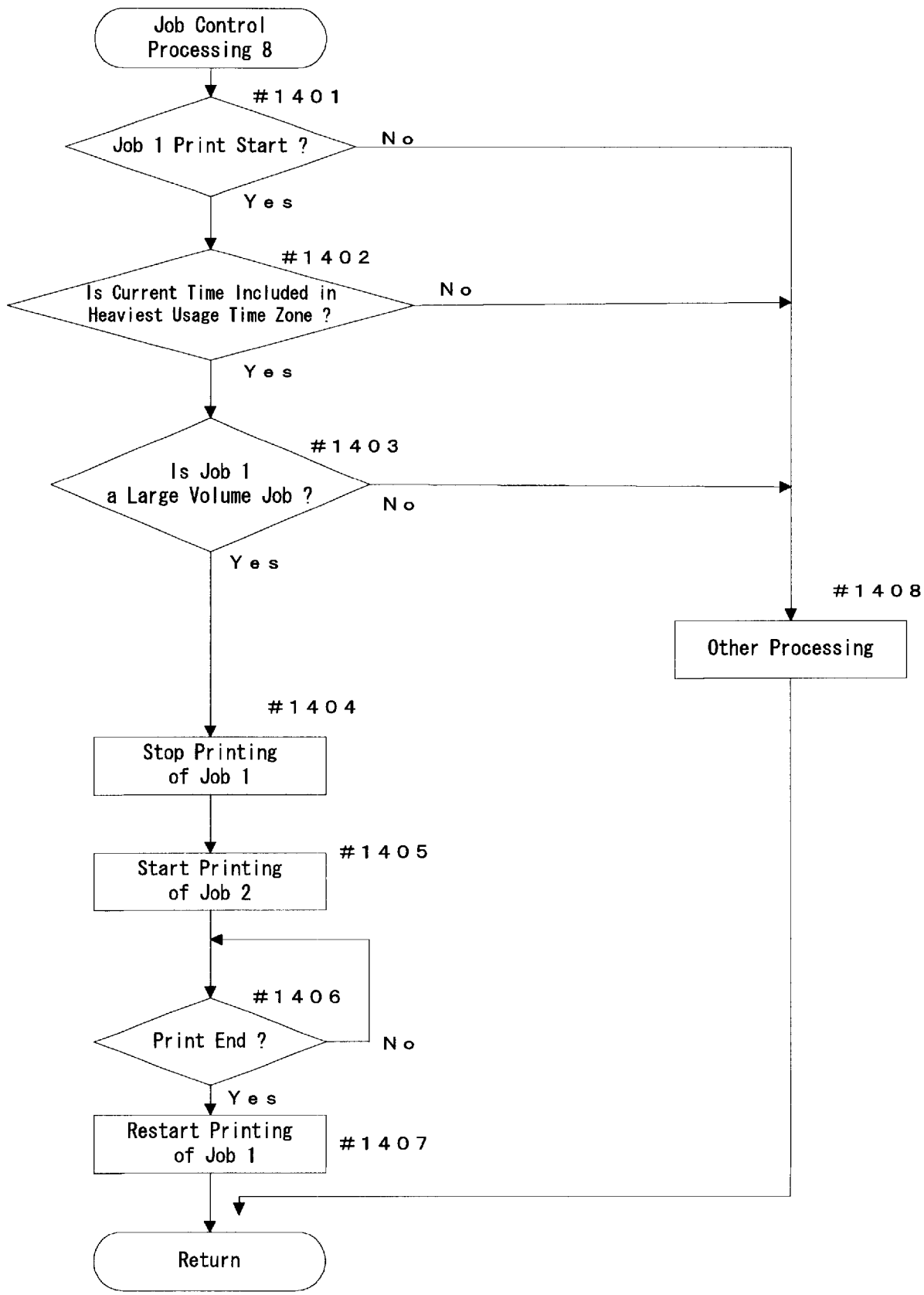
FIG. 17 is a flow chart showing the subroutine of the job control process of a eight embodiment.

FIG. 17 is a flow chart of the job control process 8 executed in step S34 of FIG. 7.

Referring to the drawing, a determination is made as to whether or not a print start request has been issued in step #1401. If the determination is YES, a determination is made in step #1402 as to whether or not the current time is included in the time zone of peak use of the image forming apparatus. The time zone of peak use of the image forming apparatus is determined by the flow chart shows in FIGS. 9 and 10.

When the determination in step 41402 is YES, a determination is made as to whether or not job 1 is a large volume job (i.e. a job requiring printing of a number of sheets exceeding a specific threshold value) in step #1403. When the determination is YES, the execution of job 1 currently being printed is temporarily stopped in step #1404 and the printing of job 2 is started in step #1406, a check is made to determine whether or not the printing of job 2 is completed, and the completion of job 2 is awaited. When the printing of job 2 is completed, the temporarily interrupted printing of job 1 is restarted in step #1407.

When the determination is NO in any of the steps #1401~#1403, other processes are executed in step #1408.

In the present embodiment as described above, when the current time during the execution of a job of large volume output is determined to be included in the time zone of peak use of the image forming apparatus, and a next job (job 2) is input, the second job can have priority output. In this way the image forming apparatus is used more efficiently by the users.

Ninth Embodiment

The image forming apparatus of the ninth embodiment is provided with a construction identical to that of the first embodiment shown in FIGS. 1~7, 9, and 10. Therefore, description of the construction shown in these drawings is omitted. In the ninth embodiment, the job control process 1 of FIG. 8 is replaced by the job control process 9 shown in FIG. 18.

Figure 18:
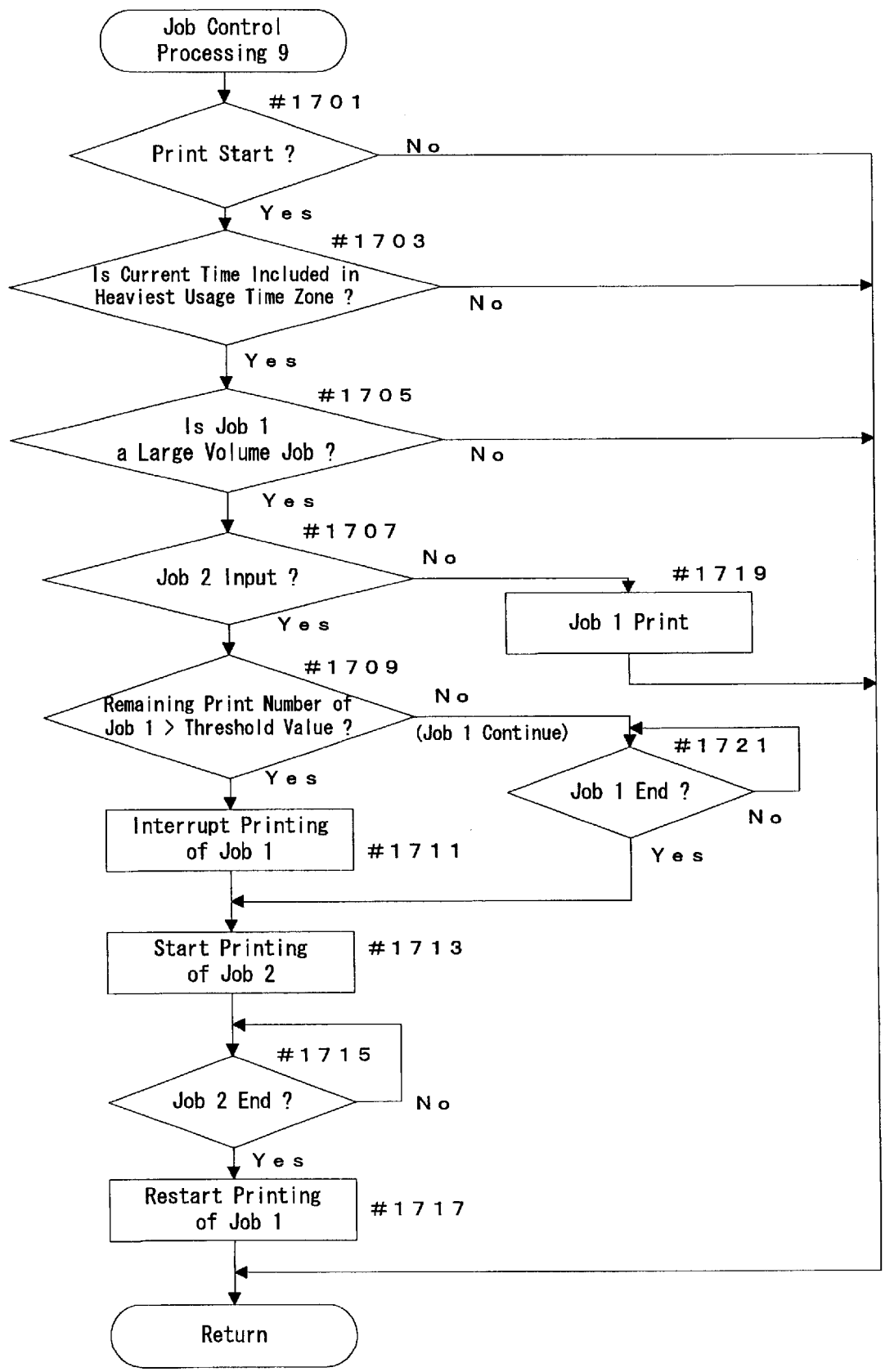
FIG. 18 is a flow chart showing the subroutine of the job control process of a ninth embodiment.

FIG. 18 is a flow chart of the job control process 4 executed in step S34 of FIG. 7.

Referring to the drawing, a check is made in step #1701 to determine whether or not a print start request has been issued. If the determination is YES, a determination is made in step #1703 as to whether or not the current time is included in the time zone of peak use of the image forming apparatus. This determination is made using the result of execution of the processes shown in FIGS. 9 and 10.

When the determination in step #1703 is YES, a determination is made in step #1705 as to whether or not job 1 is a large volume job. If the determination is YES, a check is made to determine whether or not a job 2 has been input in step #1707. If the determination is YES, the routine advances to step #1709.

In step #1709, a determination is made as to whether or not the number of remaining sheets to be printed of job 1 (number of remaining sheets) exceeds a specific threshold value, and if the determination is YES, job 1 is interrupted in step #1711. Then, the printing of job 2 is started in step #1713, and the completion of printing of job 2 is awaited in step #1715.

When the printing of job 2 is completed, the printing job 1 is restarted in step #1717.

If the determination is NO in step #1707, the printing of job 1 continues in step #1719.

When the determination is NO in step #1709, a check is made to determine whether or not the printing of job 1 has been completed in step #1721. If the determination is YES, the printing of job 2 is started in step #1713.

When the determination is NO in step #1721, printing of job 1 is executed directly.

In the embodiments described above, when a new job 2 is input during the printing of a job 1, the number of sheets remaining to be printed of job 1 is compared to a specific number of sheets, and job 1 is interrupted based on the comparison result. In this way printing is controlled while considering the time required for job 1, and the image forming apparatus is used more efficiently by the users.

It is desirable that the threshold value for determining whether or not a job is a large volume job can be set and changed by the user by displaying on the screen shown in FIG. 4.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus comprising:
   a first timer for timing an exclusive use time of the apparatus for a first job currently executing;
   a comparator for comparing the measured exclusive use time to a previously set threshold value; and
   a controller for controlling the execution of a second job different from the first job based on the comparison result of the comparator;
   wherein said controller interrupts the execution of the first job and starts the execution of the second job when the exclusive use time measured by the timer exceeds the threshold value;
   wherein said controller restarts the execution of the first job after the second job operation ends.

2. An image forming apparatus comprising:
   a first timer for timing an exclusive use time of the apparatus for a first job currently executing;
   a comparator for comparing the measured exclusive use time to a previously set threshold value; and
   a controller for controlling the execution of a second job different from the first job based on the comparison result of the comparator;
   wherein said controller interrupts the execution of the first job and starts the execution of the second job when the exclusive use time measured by the timer exceeds the threshold value;
   wherein said controller starts the execution of a third job after the second job operation ends.

3. An image forming apparatus comprising:
   a first timer for timing an exclusive use time of the apparatus for a first job currently executing;
   a comparator for comparing the measured exclusive use time to a previously set threshold value; and
   a controller for controlling the execution of a second job different from the first job based on the comparison result of the comparator;
   wherein said controller interrupts the execution of the first job and starts the execution of the second job when the exclusive use time measured by the timer exceeds the threshold value;
   wherein said controller determines a next job to be executed after the second job operation ends, based on operation input from a user.

4. An image forming apparatus comprising:
   a first timer for timing an exclusive use time of the apparatus for a first job currently executing;
   a comparator for comparing the measured exclusive use time to a previously set threshold value; and
   a controller for controlling the execution of a second job different from the first job based on the comparison result of the comparator;
   a second timer for timing an exclusive use time of the apparatus by the second job,
   wherein said controller interrupts the execution of the first job and starts the execution of the second job when the exclusive use time measured by the timer exceeds the threshold value; and
   wherein said controller interrupts the execution of the second job and restarts the execution of the first job when the exclusive use time of the second job exceeds a predetermined value.

5. An image forming apparatus comprising:
   a first timer for timing an exclusive use time of the apparatus for a first job currently executing;
   a comparator for comparing the measured exclusive use time to a previously set threshold value; and
   a controller for controlling the execution of a second job different from the first job based on the comparison result of the comparator; and
   a first determination device for determining whether or not the current moment is included in a specified time zone,
   wherein said controller controls the execution of the second job based on the determination result.

6. An image forming apparatus as claimed in claim 5,
   wherein said specified time zone is a time zone of heavy use of the image forming apparatus, and the time zone is determined in accordance with a usage condition of the image forming apparatus.

7. An image forming apparatus comprising:
   a first timer for timing an exclusive use time of the apparatus for a first job currently executing;
   a comparator for comparing the measured exclusive use time to a previously set threshold value; and
   a controller for controlling the execution of a second job different from the first job based on the comparison result of the comparator;
   a determination device for determining whether or not there is the second job;
   wherein said controller controls the execution of the second job based on the determination result;
   wherein said first timer clears the current count time and restarts counting, when the exclusive use time measured by the first timer exceeds the threshold value and the determination device determines there is the second job.

8. An image forming apparatus comprising:
   a first timer for timing an exclusive use time of the apparatus for a first job currently executing;
   a comparator for comparing the measured exclusive use time to a previously set threshold value; and
   a controller for controlling the execution of a second job different from the first job based on the comparison result of the comparator; and
   an operation panel for changing the threshold value via operation by a user.

9. An image forming apparatus comprising:
   a first determination device for determining whether or not a current time zone is included in a specified time zone;
   a second determination device for determining whether or not a number of printed sheets of a currently executing first job has exceeded a previously set threshold value; and
   a controller for controlling the execution of a second job different from the first job based on the determination results of the first determination device and the second determination device.

10. An image forming apparatus as claimed in claim 9,
    wherein said controller interrupts the execution of the first job and starts the execution of the second job, when the first determination device determines that the current time zone is included in the specified time zone and the second determination device determines the number of printed sheets of the first job exceeds the threshold value.

11. An image forming apparatus as claimed in claim 10, wherein controller restarts the execution of the first job after the second job operation ends.

12. An image forming apparatus as claimed in claim 9, further comprising:

an operation panel for changing the threshold value via operation by a user.

13. An image forming apparatus as claimed in claim 9, further comprising:

a third determination device for determining whether or not there is the second job, wherein said controller controls the execution of the second job based on the determination result of the third determination device.

14. An image forming apparatus as claimed in claim 13, further comprising:

a fourth determination device for determining whether or not a number of remaining print sheets of a currently executing first job exceeds a specific value, wherein said controller controls the execution of the second job based on the determination result of the fourth determination device.

15. A method of controlling jobs in an image forming apparatus, comprising the steps of:

starting the execution of a first job;

measuring an exclusive use time of the apparatus by a currently executing first job;

comparing the measured exclusive use time with a previously set threshold value;

interrupting execution of the first job based on the comparison result and starting execution of a second job different from the first job; and restarting execution of the first job after execution of the second job ends.

16. A method of controlling jobs in an image forming apparatus, comprising the steps of:

executing a first job;

determining whether or not the current moment is included in a specified time zone;

determining whether or not a number of printed sheets of the first job exceeds a previously set threshold value; and interrupting the execution of the first job and starting execution of a second job different from the first job when the current moment is determined to be included in the specified time zone and the number of printed sheets of the first job is determined to exceed the threshold value.

* * * * *